Dec. 14, 1943.  F. R. CONKLIN ET AL  2,336,532
LAMINATED GLASS
Filed July 11, 1939
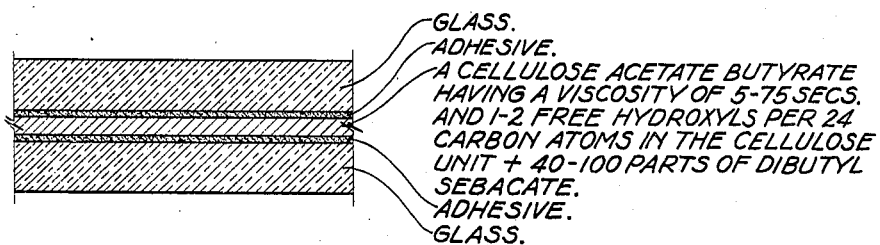
GLASS.
ADHESIVE.
A CELLULOSE ACETATE BUTYRATE HAVING A VISCOSITY OF 5-75 SECS. AND 1-2 FREE HYDROXYLS PER 24 CARBON ATOMS IN THE CELLULOSE UNIT + 40-100 PARTS OF DIBUTYL SEBACATE.
ADHESIVE.
GLASS.
FREDERICK R. CONKLIN
JOSEPH D. RYAN
INVENTORS
BY
ATTORNEYS Patented Dec. 14, 1943

2,336,532

UNITED STATES PATENT OFFICE 2,336,532

LAMINATED GLASS

Frederick R. Conklin, Kingsport, Tenn., and Joseph D. Ryan, Toledo, Ohio, assignors of one-half to Libbey-Owens-Ford Glass Company, a corporation of Ohio, and one-half to Eastman Kodak Company, a corporation of New Jersey Application July 11, 1939, Serial No. 283,863

4 Claims. (Cl. 154—2.80)

This invention relates to laminated glass in which the inner layer essentially consists of a cellulose acetate butyrate containing 30–55% butyryl, having a viscosity of 5–75 seconds and 1–2 free hydroxyls per 24 carbon atoms in the cellulose unit and 40–100 parts of dibutyl sebacate.

Due to its characteristic of shattering when broken, ordinary plate glass has been replaced in many uses by glass having a re-enforcing inner layer. This is particularly true of situations where there is much danger of the glass being subjected to sudden impact where shattering would cause considerable physical injury. Much of the laminated glass in use at the present time, however, is not capable of withstanding extreme weather conditions, such as extreme cold, on one hand, and heat on the other, rain and high humidity, on the one hand, and extreme dryness on the other. Also, the intense rays from the sun have considerable effect on many types of laminated glass. The ideal laminated glass is one that is useful and varies little throughout the whole range of conditions which are experienced in actual use.

One object of our invention is to provide a laminated glass which exhibits a high strength under conditions of extreme atmospheric cold and extreme atmospheric heat, as well as under more moderate conditions, which are met with in outdoor use. Another object of our invention is to provide a laminated glass, the inner layer of which is resistant at the exposed edges, to the effect of leaching by water or by the presence of moisture. A further object of our invention is to provide a laminated glass in which the cold strength may be increased by increasing the thickness of the inner layer which is employed.

The drawing shows one form of the article of the invention.

We have found that, if the inner layer of laminated glass is composed of a sheet of 100 parts of a stable, high butyryl, cellulose acetate butyrate, plasticized with at least 40 parts of dibutyl sebacate, the resulting product has a high breaking strength at 0° F., 70° F. and at 120° F. Also we have found that by increasing the thickness of the inner layer of the laminated glass, its resistance to impact at 0° F. was markedly increased. We have also found that laminated glass, having an inner layer essentially consisting of a stable, high butyryl, cellulose acetate butyrate and 40–100 parts of dibutyl sebacate, as the plasticizer, resists the effects of moisture and is not prone to blush or become translucent or opaque, such as is characteristic of some types of laminated glass. We have found that laminated glass, in accordance with our invention, is also highly resistant to the actinic rays of the sun and hence will stand up well in use under the most widely varied weather conditions.

The dibutyl sebacate may be used in the inner layer of our laminated glass in the proportion of 40–100 parts per 100 parts of cellulose ester. This proportion will be referred to herein as 40–100% of dibutyl sebacate. A laminated glass was prepared using for the inner layer a stable cellulose acetate butyrate having a butyryl content of approximately 38% plasticized with 40 parts of dibutyl sebacate. Using an inner layer having a thickness of .025 in., the laminated glass at a temperature of 0° F. resisted the impact of a one-half pound steel ball dropped thru a distance of 16 ft. When the thickness of the inner layer was .050 in. using the same composition the laminated glass at 0° F. resisted the impact of a one-half pound steel ball dropped thru a distance of 33 feet. We have found dibutyl sebacate to be so effective that its mixture with as much as equal parts of other plasticizers, such as dibutyl or diamyl phthalate or triphenyl phosphate, gives good resistance, particularly when using a high proportion of plasticizer. For instance, laminated glass, containing an inner layer consisting of a stable, high butyryl, cellulose acetate butyrate and 70 parts of a mixture of dibutyl sebacate and triphenyl phosphate in equal proportions, has been found to resist the impact of a ½ lb. steel ball dropped through at least 16 ft. with the glass at 0° F. It is to be understood that wherever "cold break" is referred to herein, it refers to the resistance to impact of laminated glass at 0° F. when tested by the dropping of a one-half pound steel ball thereon.

The cellulose acetate butyrate, which is mixed with the dibutyl sebacate, should have a butyryl content of 30–55% and be really stable, as evidenced by a char point of at least 260° C. and preferably approximately 300° C. or more in contrast to the high butyryl cellulose acetate butyrates previously disclosed. It should have a viscosity of 5–75 sec. (1 part in 4 parts of acetone). The cellulose esters, which we have usually employed, have been made by reacting upon cellulose with an acylation mixture containing a substantial proportion of butyric anhydride so as to assure the obtaining of a high butyryl ester. The high butyryl cellulose esters may be prepared, as described in Gardner Patent No. 2,113,301 of April 5, 1938 or as described in Malm and Kirton application Serial No. 254,492, filed February 3, 1939.

The cellulose acetate butyrates, which we have employed, were stabilized in accordance with the process described and claimed in the Malm and Kirton application. Our invention is restricted to the use of esters which have either been stabilized in accordance with the process described and claimed in the Malm and Kirton application or which have a stability equivalent to the esters prepared according to that process. A cellulose acetate butyrate, which has been found to be particularly satisfactory for mixing with dibutyl sebacate for use in the inner layer of laminated glass in accordance with our invention, has a butyryl content of 35–38%, substantially the remainder of the acyl being acetyl, which ester has been hydrolyzed approximately one-third of the way down to the diester and has a char point of at least 280° C.

Not only does the sheeting composed of a mixture of stable, high butyryl, cellulose acetate butyrate and dibutyl sebacate exhibit a low temperature co-efficient, but also, it is distinctive in its resistance to leaching. For instance, a sample of cellulose acetate butyrate sheeting, containing 40 parts of dibutyl sebacate and having dimensions 1" x 4" x .025", was subjected to boiling water for one hour. The resulting material showed no loss of dibutyl sebacate, while, on the other hand, a large number of like samples, plasticized with other compounds, which were regarded as good plasticizers for cellulose acetate butyrate, lost some of their plasticizer content upon treating in this manner. Immersion of this acetate butyrate sheeting, plasticized with 40 parts of dibutyl sebacate in water at 100° F., for two weeks resulted in only a negligible loss of plasticizer, whereas, plasticized cellulose acetate sheeting, such as ordinarily used for laminated glass, exhibited a loss of plasticizer of approximately 24%. The cellulose acetate sheeting blushed after standing one day in the water at 100° F., while the cellulose acetate butyrate sheeting, containing dibutyl sebacate, retained its transparency over the entire two weeks.

As an example of making laminated glass in accordance with our invention, the glass plates are first thinly coated with an acetone solution of a fully esterified, low viscosity, cellulose acetate butyrate, having a butyryl content approximately equal to that of the cellulose ester used for the inner layer, from which coating the solvent is evaporated off. The cellulose ester employed for this bonding layer may be prepared in accordance with the process described in Arner and Wampler Patent No. 2,071,377. A transparent sheet essentially consisting of a stable cellulose acetate butyrate, having a butyryl content of approximately 38% and one hydroxyl to every 24 carbon atoms in the cellulose unit and approximately an equal amount of dibutyl sebacate is placed between the two sheets of glass with the coated sides of the glass facing the cellulose ester sheet. The sandwich is then pressed together and finally composited in an autoclave at a temperature of about 135° C. and a pressure of 180–200 pounds per square inch. A laminated glass, having high resistance to breakage at 0° F., 70° F. and 120° F., is obtained.

Thus it may be seen that our laminated glass is particularly adapted for situations in which variable temperature conditions are experienced. For instance, temperatures up to 120° F. may be experienced in summer and temperatures down to 0° F. or lower may be met with in winter and yet the same laminated glass will have to serve its purpose in both seasons. The breaking strength of the laminated glass in accordance with our invention, is comparable at 0° F. and at 120° F. with that at 70° F. Hence our laminated glass has substantially equal utility at all atmospheric temperatures.

Also the moisture conditions may vary widely in the use of laminated glass as most localities experience wet and dry intervals during the course of a year. The laminated glass described herein is adapted to maintain its characteristics even under adverse moisture conditions or when subjected to a considerable variation in humidity from time to time.

Because of its stability the laminated glass described herein is resistant to the effect of the sun's rays and retains its transparency and resistance to breaking in all common conditions of use. Therefore, its permanence in all kinds of weather bespeaks its suitability for use where a transparent and permanent material is desired.

The laminated glass described herein, as has been pointed out previously, stands up well when subjected to impact and is characterized by resistance at 0°, 70° and 120° F. to the impact of a one-half pound steel ball falling a distance of at least 15 feet.

The term "resists impact" as employed herein is to be understood as meaning that rupture of the entire laminated glass structure does not occur from the force of the impact.

The thickness of the inner layer of the laminated glass in accordance with our invention may be varied as desired. For instance where prevention of shattering of the glass is the primary object, the resistance to impact being secondary, the inner layer may be less than .025" thick, such as any thickness down to .010" or .005" or less.

Any thickness from .025" up to .050" or more may be employed giving good resistance to impact. A thickness of .020–.030" for the inner layer has been found satisfactory, however, for most purposes and under the usual conditions in which laminated glass is to be used, it is preferred to employ an inner layer of that thickness.

Our new laminated glass is outstanding in that it resists much greater impact at 0°, 70° and 120° F. than does laminated glass in which the plastic sheet is composed of cellulose nitrate or cellulose acetate of equal thickness; this is readily apparent from the fact that laminated glass employing a sheet of cellulose nitrate or cellulose acetate as the plastic inner layer will, at 0° F., resist the impact of a one-half pound steel ball from a height no greater than four to five feet, regardless of the percentage of dibutyl sebacate incorporated as a plasticizer in the plastic sheet.

We claim:

1. Laminated glass containing an inner layer essentially consisting of 100 parts of cellulose acetate butyrate containing 30–55% butyryl and having a viscosity of 5–75 seconds, a char point of at least 260° C. and 1–2 free hydroxyls per 24 carbon atoms in the cellulose unit and 40–100 parts of a plasticizer essentially consisting of dibutyl sebacate, which laminated glass at 0° F., when the inner layer is .025 in. thick, resists the impact of a one-half lb. steel ball dropped from a height of at least fifteen feet.

2. Laminated glass containing an inner layer essentially consisting of 100 parts of cellulose acetate butyrate containing 35–38% butyryl and having a viscosity of 5–75 seconds, a char point of at least 280° C. and 1-2 free hydroxyls per 24 carbon atoms in the cellulose unit and 40-100 parts of dibutyl sebacate, which laminated glass at 0° F., when the inner layer is .025 in. thick, resists the impact of a one-half pound steel ball dropped from a height of at least fifteen feet.

3. Laminated glass containing an inner layer essentially consisting of 100 parts of cellulose acetate butyrate containing 30-55% butyryl and having a viscosity of 5-75 seconds, a char point of at least 260° C. and 1-2 free hydroxyls per 24 carbon atoms in cellulose unit and 40 parts of a plasticizer essentially consisting of dibutyl sebacate, which laminated glass at 0° F., when the inner layer is .025 in. thick, resists the impact of a one-half lb. steel ball dropped from a height of at least fifteen feet.

4. Laminated glass containing an inner layer essentially consisting of 100 parts of cellulose acetate butyrate containing 35-38% butyryl and having a viscosity of 5-75 seconds, a char point of at least 280° C. and 1-2 free hydroxyls per 24 carbon atoms in the cellulose unit and 100 parts of dibutyl sebacate, which laminated glass at 0° F., when the inner layer is .025 in. thick, resists the impact of a one-half pound steel ball dropped from a height of at least fifteen feet.

FREDERICK R. CONKLIN.
JOSEPH D. RYAN.